US011156085B2

(12) United States Patent
Al-Malki et al.

(10) Patent No.: US 11,156,085 B2
(45) Date of Patent: Oct. 26, 2021

(54) SYSTEM AND METHOD FOR SAMPLING FORMATION FLUID

(71) Applicant: Saudi Arabian Oil Company, Dhahran (SA)

(72) Inventors: Bander S. Al-Malki, Dhahran (SA); Faisal M. Sarwi, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 78 days.

(21) Appl. No.: 16/590,193

(22) Filed: Oct. 1, 2019

(65) Prior Publication Data

US 2021/0095561 A1 Apr. 1, 2021

(51) Int. Cl.
*E21B 49/08* (2006.01)
*E21B 43/40* (2006.01)
*B01D 17/02* (2006.01)

(52) U.S. Cl.
CPC .......... *E21B 49/082* (2013.01); *E21B 43/40* (2013.01); *B01D 17/0211* (2013.01)

(58) Field of Classification Search
CPC ...... E21B 49/08; E21B 49/081; E21B 49/082; E21B 49/10; E21B 43/38; E21B 43/385; E21B 43/40; B01D 17/0211
See application file for complete search history.

(56) References Cited

U.S. PATENT DOCUMENTS

| | | | |
|---|---|---|---|
| 5,337,822 A | 8/1994 | Massie et al. | |
| 5,431,228 A | 7/1995 | Weingarten et al. | |
| 5,474,601 A * | 12/1995 | Choi | B01D 19/0057 166/105.3 |
| 5,482,117 A | 1/1996 | Kolpak et al. | |
| 5,794,697 A | 8/1998 | Wolflick et al. | |
| 5,840,198 A * | 11/1998 | Clarke | B01D 17/0211 210/802 |
| 6,092,416 A | 7/2000 | Halford et al. | |
| 6,179,054 B1 | 1/2001 | Stewart | |

(Continued)

FOREIGN PATENT DOCUMENTS

| | | | | |
|---|---|---|---|---|
| CN | 110075622 A * | 8/2019 | | |
| WO | WO-2007021335 A2 * | 2/2007 | ............. | B01D 45/16 |

OTHER PUBLICATIONS

PCT Invitation to Pay Additional Fees and Communication Relating to the Results of the Partial International Search dated Dec. 4, 2020, issued for PCT/US2020/053730, 15 pages.

(Continued)

*Primary Examiner* — Jennifer H Gay
(74) *Attorney, Agent, or Firm* — Bracewell LLP; Constance Gall Rhebergen

(57) ABSTRACT

Formation fluid sampled from within a wellbore is separated into gas and liquid fractions while downhole and in a wellbore. A separator vessel is used to isolate the gas and liquid fractions from one another. Baffles are arranged in a staggered formation within the separator vessel and in the path of the flow of the sampled formation fluid. Contact with the baffles perturbs the flow of sampled formation fluid, which promotes escape of the gas fraction from the fluid. The gas fraction is ported from an upper end of the sample vessel to a sample bottle for analysis. The liquid fraction collects in a lower end of the sample vessel, and is discharged into the wellbore.

19 Claims, 5 Drawing Sheets

(56) References Cited

U.S. PATENT DOCUMENTS

| | | | |
|---|---|---|---|
| 6,745,835 B2 | 6/2004 | Fields | |
| 7,195,063 B2 | 3/2007 | Nogueira et al. | |
| 7,644,611 B2* | 1/2010 | Kamiya | E21B 43/38 |
| | | | 73/152.28 |
| 8,136,600 B2* | 3/2012 | Fowler | B01D 19/0057 |
| | | | 166/357 |
| 8,210,260 B2 | 7/2012 | Milkovisch et al. | |
| 8,215,388 B2* | 7/2012 | van Zuilekom | E21B 43/38 |
| | | | 166/264 |
| 9,004,166 B2 | 4/2015 | Raglin | |
| 9,068,436 B2 | 6/2015 | Theron et al. | |
| 9,249,653 B1* | 2/2016 | Botts | E21B 27/04 |
| 9,289,700 B2* | 3/2016 | Andreussi | B01D 17/0211 |
| 9,322,267 B2 | 4/2016 | Pop et al. | |
| 9,752,431 B2 | 9/2017 | Bullock et al. | |
| 9,765,617 B2 | 9/2017 | Gosney et al. | |
| 9,951,598 B2 | 4/2018 | Roth et al. | |
| 2008/0066538 A1* | 3/2008 | Kamiya | E21B 49/081 |
| | | | 73/152.28 |
| 2008/0236822 A1 | 10/2008 | Reeves et al. | |
| 2009/0211763 A1* | 8/2009 | Fowler | B01D 19/0057 |
| | | | 166/357 |
| 2010/0089569 A1* | 4/2010 | van Zuilekom | E21B 43/38 |
| | | | 166/250.01 |
| 2010/0095758 A1 | 4/2010 | Georgi et al. | |
| 2010/0229623 A1 | 9/2010 | Abad et al. | |
| 2012/0285680 A1* | 11/2012 | Kumar | E21B 43/38 |
| | | | 166/264 |
| 2013/0025854 A1* | 1/2013 | Theron | E21B 33/0355 |
| | | | 166/264 |
| 2013/0071934 A1* | 3/2013 | Indo | G01N 33/287 |
| | | | 436/28 |
| 2013/0292327 A1* | 11/2013 | Andreussi | B01D 17/0211 |
| | | | 210/521 |
| 2013/0313200 A1* | 11/2013 | Andreussi | C02F 9/00 |
| | | | 210/708 |
| 2014/0345860 A1 | 11/2014 | Van Zuilekom et al. | |
| 2014/0361155 A1* | 12/2014 | Daito | E21B 49/081 |
| | | | 250/256 |
| 2015/0198039 A1* | 7/2015 | Marshall | G01N 33/2847 |
| | | | 73/152.42 |
| 2016/0018554 A1* | 1/2016 | Vigneaux | G01N 21/15 |
| | | | 250/262 |
| 2017/0022797 A1* | 1/2017 | Joshi | E21B 43/40 |
| 2018/0320500 A1* | 11/2018 | Williams | E21B 43/126 |
| 2019/0284919 A1* | 9/2019 | Jones | G01N 1/40 |
| 2020/0292477 A1* | 9/2020 | Edwards | E21B 49/10 |
| 2020/0318477 A1* | 10/2020 | Pfeiffer | E21B 49/08 |
| 2020/0400018 A1* | 12/2020 | Neubert | E21B 49/005 |
| 2021/0095561 A1* | 4/2021 | Al-Malki | E21B 43/40 |

OTHER PUBLICATIONS

PCT Search Report dated Feb. 2, 2021, in the prosecution of International patent application No. PCT/US2020/053730, 21 pages.

* cited by examiner

SYSTEM AND METHOD FOR SAMPLING FORMATION FLUID

BACKGROUND

1. Field

The present disclosure relates to obtaining samples of gas within subterranean formation fluid. More specifically, the present disclosure relates to obtaining a formation fluid sample downhole, separating the sample into gas and liquid fractions, and collecting the gas fraction and discharging the liquid fraction into a wellbore

2. Description of Prior Art

Information about a formation surrounding a wellbore is sometimes analyzed based on fluid in the formation. One manner of sampling formation fluid involves inserting a tubular probe member into the formation from inside the wellbore, and drawing formation fluid through the probe member into a sampling tool disposed in the wellbore. Typical sampling tools are sonde like members with an outer housing. Vessels are usually mounted inside the housing for storing the sampled formation fluid. Also in the housing are controls and actuators for deploying the probe member into contact with the formation, and for drawing the fluid into the probe member and the vessel. Types of information available from an analysis of the sampled formation fluid include constituents within the formation fluid, ratios of gas, oil, and water, as formation pressure.

It is usually necessary that the sample of fluid drawn from the formation be substantially free of filtrate, mudcake, and other solids that sometimes introduce impurities which reduce reliability of data from the sampled fluid. Sampled fluid deemed to contain an unacceptable amount of impurities is often discharged into the wellbore, but not back into the formation. In some instances the gas content of the sampled fluid is sufficient to reduce hydrostatic head of a mud column inside the wellbore by an amount that affects pressure control.

SUMMARY OF THE INVENTION

Disclosed is an example of a downhole tool for use in a wellbore, and which includes a housing, a probe member that radially extendable from the housing and has an end that is selectively in communication with fluid disposed in a formation around the wellbore, a separator tank in the housing coupled with the probe member, and which selectively receives a flow of formation fluid from the probe member, a liquid drain line having an inlet end in fluid communication with liquid inside the separator tank, and an exit end that projects outside of the housing and is in selective communication with the wellbore, and a sample bottle in communication with gas inside the separator tank through a vent line. In alternate embodiments the downhole tool further includes a pump disposed in the liquid drain line, a valve disposed in the probe member which in an optional embodiment includes an actuator coupled to the valve. In one example, baffles are also included which are disposed in the separator tank and are strategically disposed in an interfering path of the flow of formation fluid. In an alternative to this example, openings are in the baffles that receive gas released from the formation fluid flowing in the separator tank. Further optionally, the baffles are arranged at different azimuthal locations within the separator tank.

Another example of a downhole tool for use in a wellbore is disclosed, which includes a housing, a separator tank in selective communication with a flow of fluid sampled from a formation surrounding the wellbore, planar baffles mounted at different elevations in the separator tank and strategically arranged in a projected path of the flow of fluid inside the separator tank, and a gas vent line connected to the separator tank and that selectively contains an amount of gas released from contact of the flow of fluid with a one of the baffles. In an example, the downhole tool further includes a liquid discharge line having an end in fluid communication with liquid from the flow of fluid, and an opposing end outside of the housing and in direct communication with the wellbore, and where a flow of the liquid from the flow of fluid flows through the liquid discharge line from the separator tank and directly into the wellbore. A sample bottle is optionally included that is in communication with an end of the gas vent line distal from the separator tank, and which selectively contains an amount of the gas released from the flow of fluid. Also optionally included is a probe member that projects radially from the housing and with opposing ends in selective communication with fluid in the formation and the separator tank. In an alternative, arms are provided that are selectively deployed radially away from the housing on a side opposite the probe member.

Also included is an example of a method of downhole operations in a wellbore, and which includes separating a flow of fluid sampled from a formation that is around the wellbore into a gas fraction and a liquid fraction, containing at least a portion of the gas fraction in the wellbore, and removing the portion from the wellbore, and directing the entire liquid fraction into the wellbore. In an embodiment, the step of separating involves directing the flow of fluid into a separator tank, and impinging the flow of fluid into interfering contact with a series of strategically arranged baffles in the separator tank that cause the gas fraction to escape from the flow of fluid. Optionally, pumping the liquid makes up the step of directing the entire liquid fraction into the wellbore. In an example, the method further includes collecting the flow of fluid from the formation by deploying a probe member from a side of a downhole tool and into intersecting contact with the formation. The gas fraction is optionally maintained in a sample bottle that is disposed in a housing of a downhole tool. In an alternative, the method further includes analyzing the flow of fluid with an optical analyzer prior to the step of separating. Discharging the liquid fraction back into the wellbore alternatively increases a static head of a liquid column in the wellbore.

BRIEF DESCRIPTION OF DRAWINGS

Some of the features and benefits of the present invention having been stated, others will become apparent as the description proceeds when taken in conjunction with the accompanying drawings, in which.

Figure 1:
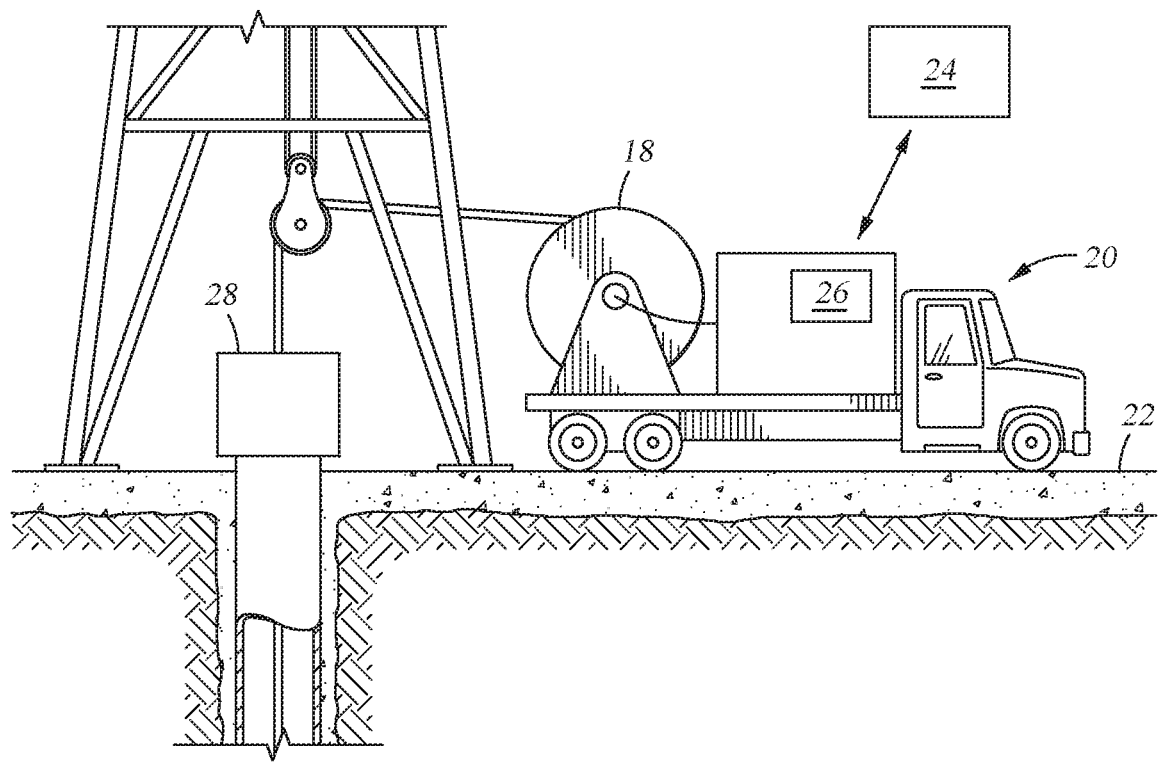
FIG. 1 is a side partial sectional view of an example of a downhole tool deployed in a wellbore.
Figure 1:
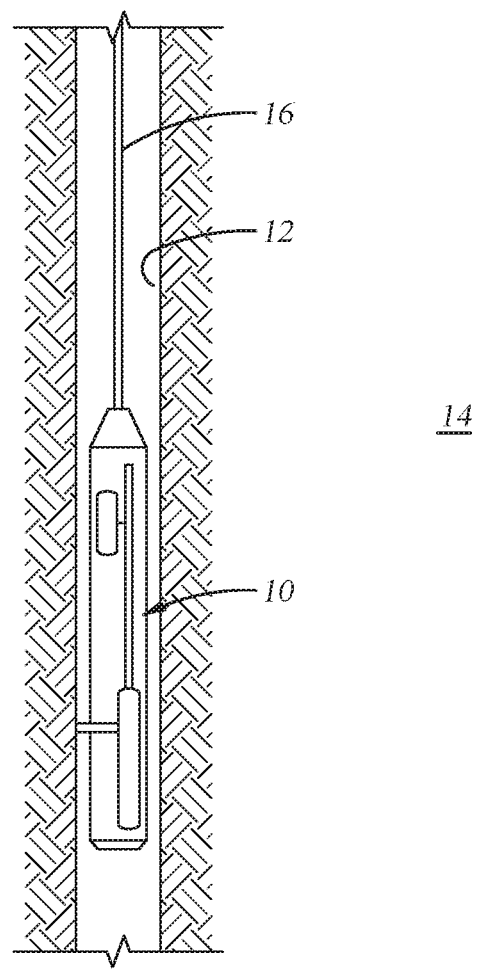

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully with reference to the accompanying drawings in which embodiments are shown. The method and system of the present disclosure may be in many different forms and should not be construed as limited to the illustrated embodiments set forth here; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in a side partial sectional view in FIG. 1 is an example of a downhole tool 10 disposed in a wellbore 12. As shown, the wellbore 12 intersects a subterranean formation 14, and in an embodiment provides a conduit for producing fluids from the formation 14. In the embodiment illustrated, the downhole tool 10 is deployed and supported on a wireline 16; an end of wireline 16 opposite downhole tool 10 is spooled onto a reel 18 shown mounted on a service truck 20. The service truck 20 is on surface 22 above an opening of the wellbore 12; and in an example provides transportation for the reel 18 and wireline 16, and power for operating the reel 18. An optional controller 24 is schematically depicted, in embodiments of which the controller 24 is in communication with downhole 10 via wireline 16; and alternatively generates command signals for operation of the downhole tool 10. In an example, an information handling system ("IHS") is included in controller 24; which selectively generates command or communication signals, as well as receiving communication from downhole tool 10. In further examples, IHS stores recorded data as well as processing the data into a readable format. The controller 24 as well as IHS are alternatively disposed at the surface 22, in the wellbore 12, in the service truck 20, or partially above and below the surface 22. In one example, components of the IHS include a processor, memory accessible by the processor, nonvolatile storage area accessible by the processor, and logics for performing each of the steps above described. Further included in the illustrated example is a communication means 26 for facilitating communication between controller 4 and downhole tool 10; example communication means 26 include conductive wire, fiber optics, transmitters and receivers of wireless signals, and combinations thereof. In the illustrated example, a wellhead assembly 28 is shown mounted over the opening of the wellbore 12, and through which wireline 16 is inserted.

Figure 2:
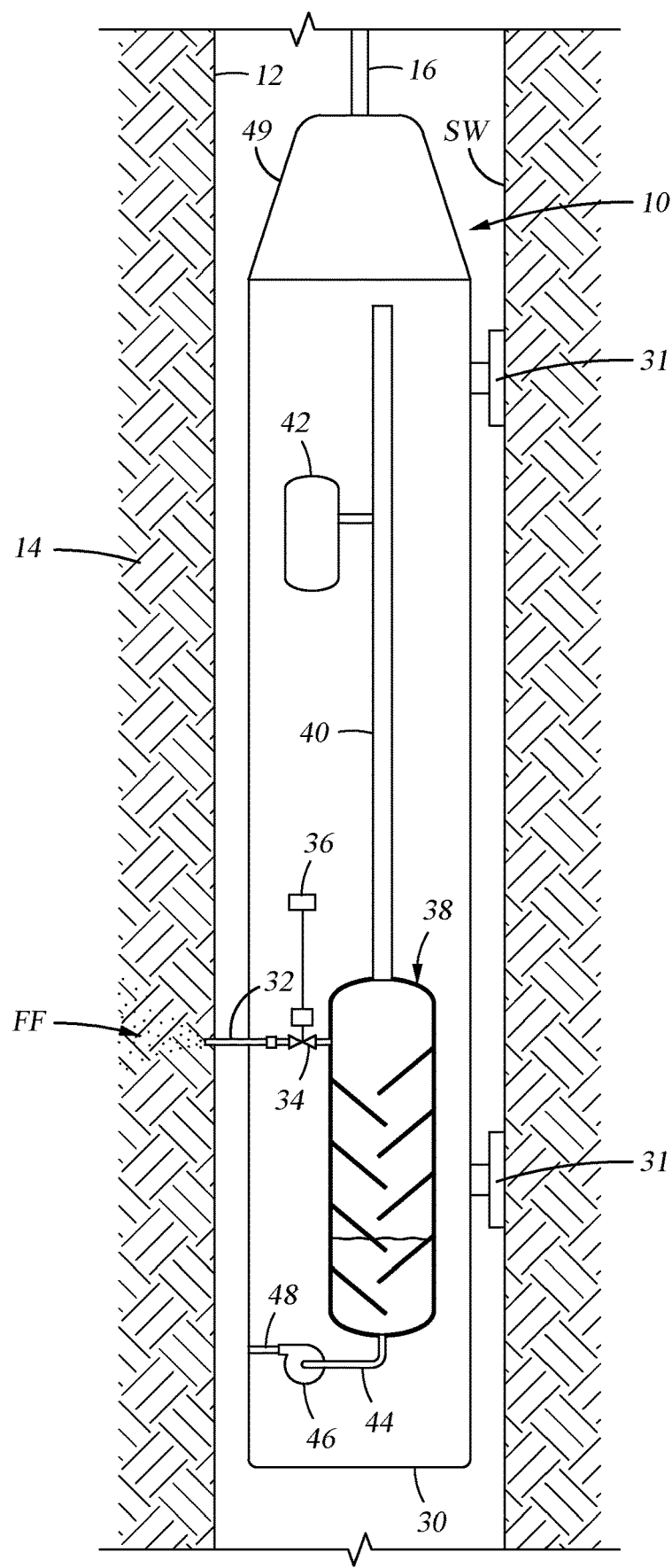
FIG. 2 is a side partial sectional view of an example of the downhole tool of FIG. 1 used to sample formation fluid.

In FIG. 2, a more detailed example of the downhole tool 10 is schematically illustrated in side partial sectional view in wellbore 12. In this example, downhole tool 10 includes a housing 30 having a sonde like shape; and arms 31 that as depicted selectively project radially outward from a side of the housing 30 and into contact with sidewall SW of the wellbore 12. A probe member 32 is shown projecting from housing 30 on a side of housing 30 distal from arms 31. In this example, probe member 32 is an annular member having an inner bore which provides fluid communication between opposing ends of probe member 32. In the example, a force is generated onto housing 30 by contacting arms 31 against the sidewall SW; which urges housing 30 in a direction away from arms 31. An actuating means (not shown) is optionally provided within tool for radially deploying and/or stowing arms 31, examples of a power source for the actuating means include electrical, hydraulic, and mechanical. The force urging housing 30 is also exerted onto probe member 32, and which causes probe member 32 to penetrate into formation 14 and past sidewall SW of wellbore 14. As illustrated, injecting probe member 32 into formation 14 puts a free end of probe member 32 distal from housing 30 into fluid communication with formation fluid FF trapped inside the formation.

As described in more detail below, a sample of the formation fluid FF is collected via the probe member 32. Further in the example of FIG. 2, a valve 34 is provided with probe member 32, which is an example is selectively opened, closed, or throttled to control a flow of the formation fluid FF through the probe member 32. An actuating means 36 is schematically illustrated that in an alternative provides energy or a driving force for actuating the valve 34. Shown in the example of FIG. 2 valve 34 and actuating means 36 are within housing 30, and alternatives exist where valve 34 and/or actuating means 36 are disposed outside of housing 30. An end of probe member 32 opposite its free end connects to a separator tank 38, which in the example is shown in housing 30. In one embodiment, separator tank 38 is a vessel like member that selectively contains and/or handles fluids within. In the described embodiment, fluid communication between separator tank 38 and formation 14 is established by probe member 32. In an example, a vent line 40 is shown having an end mounted onto separator tank 38, vent line 40 of FIG. 2 is an elongate member having an inner bore that is in communication with separator tank 38. An end of vent line 40 distal from separator tank 38 is in shown connected to and in fluid communication with a sample bottle 42. In an embodiment, sample bottle 42 is a sealable container in which fluids (such as gas) are stored and which are obtainable from within sample bottle 42; such as by opening a valve (not shown) to release the fluids from within. Also shown in the example of FIG. 2, is a drain line 44 connected to and in fluid communication with separator 38; and that terminates at a suction inlet to a pump 46. An example of a discharge line 48 is schematically shown having an inlet end connected to an exit of pump 36, and an outlet end set outside of housing 30 and in wellbore 12. In the illustrated example, fluid communication is generated between inside of separator tank 38 and directly to wellbore 12 via drain line 44, pump 46, and discharge line 48. In an alternative, drain line 46 projects through housing 30 and alone provides fluid communication between separator tank 38 and directly to wellbore 12. An optional electric module 49 is included with downhole tool 10 and mounted to an end of housing 30. In the embodiment shown, an end of electric module 49 opposite housing 30 couples with wireline. Alternatively, a cable head (not shown) is provided with electric module 49 and which facilitates connectivity (structural, electrical, and communications) between electric module 49 and wireline 16.

Figure 3:
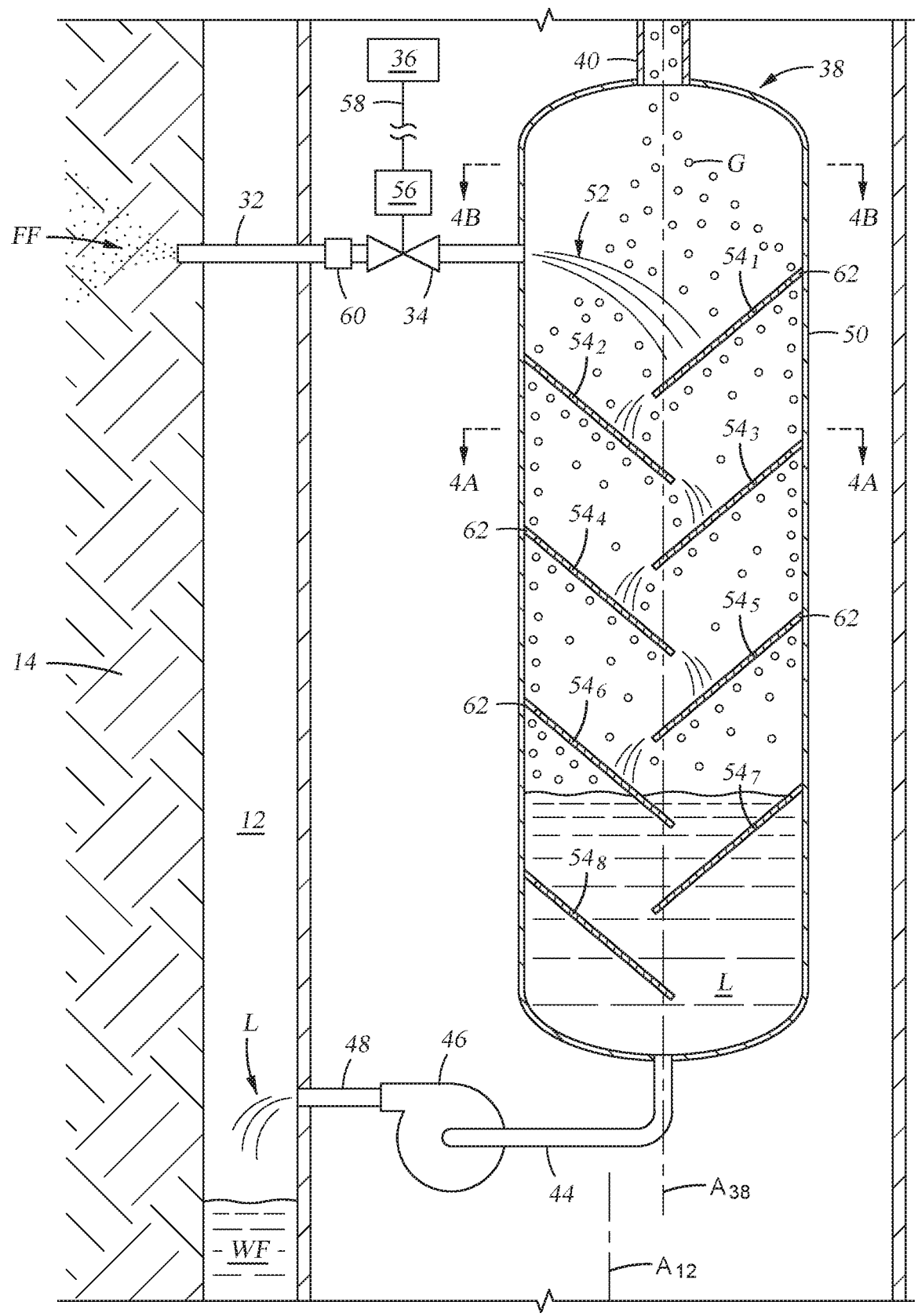
FIG. 3 is a side partial sectional view of an example of a separation tank for use with the downhole tool of FIG. 1.

Referring now to FIG. 3, an example of separator tank 38 and associated hardware are schematically shown in a side partial sectional view. In this example, separator tank 38 includes a housing 50, which provides for containment and handling of formation fluid FF sampled from the formation 14. In a non-limiting example of operation, the formation fluid FF sampled by insertion of probe member 32 into formation 14 flows through probe member 32 and enters separator tank 50 as a flow of sampled fluid 52; which is shown entering separator tank 38 in a direction substantially perpendicular to axis $A_{38}$ of separator tank 38. In the illustrated example are baffles $54_{1-8}$ shown strategically arranged within separator tank 38 which interfere with the flow of sampled fluid 52 within separator tank 38; and direct the flow of sampled fluid 52 along a tortuous path P inside separator tank 38. In an example, baffles $54_{1-8}$ are generally planar members that are semi-circular such that each baffle $54_{1-8}$ has a portion of its outer periphery that is curved, and another portion of an outer periphery of each baffle $54_{1-8}$ is straight. As illustrated, the baffles $54_{1-8}$ are anchored to the inner surface of the separator tank 38 along their curved portions so that the straight or linear portion extends radially between opposing sidewall surfaces of the separator tank 38. In the example shown, portions of each of the baffles $54_{1-8}$ proximate axis $A_{38}$ of the separator tank 38 are axially offset from portions radially distal from axis $A_{38}$. Which tilts the baffles $54_{1-8}$ in a direction towards where drain line 44 connects to separator tank 38; and when drain line 44 is in a direction of a gravity source, causes liquid deposited on the baffles $54_{1-8}$ to flow off of the straight line ends and towards the drain line 44.

Further in this example of FIG. 3, baffles $54_{1-8}$ are at different axial locations inside separator tank 38; with baffles $54_{1, 3, 5, 7}$ sequentially arranged axially along an azimuthal location inside of housing 50, and baffles $54_{2, 4, 6, 8}$ sequentially arranged axially along an azimuthal location substantially opposite baffles $54_{1, 3, 5, 7}$. Also in this example, each of baffles $54_{1, 3, 5, 7}$ are axially staggered from each of baffles $54_{2, 4, 6, 8}$. Alternatively, portions of each of the baffles $54_{1-8}$ are intersected by axis $A_{38}$ so that there is some superposition of a portion of each axially spaced apart baffle $54_{1-8}$. The tortuous path P experienced by the flow of fluid sampled 52 when introduced into the separator tank 38 with the baffles $54_{1-8}$ as described above directs the flow of fluid sampled 52 into contact with each of the baffles $54_{1-8}$ inside the separator tank 38. Not to be bound by theory, but it is believed that impinging the flow of sampled fluid 52 with one or more of baffles $54_{1-8}$ introduces a perturbation to the flow of sampled fluid 52 that releases gas G from the flow of sampled fluid 52; and by directing the flow of fluid sampled 52 onto baffles $54_{1-8}$ and along the tortuous path P, substantially separates all gas G from the flow of fluid sampled 52. Further in this example, separating gas G from the flow of sampled fluid 52 forms fractions of gas G and liquid L inside separator tank 38; which due to their different densities and the force of gravity cause the fractions to flow in different directions.

In a non-limiting example of operation, downhole tool 10 (FIG. 1) is deployed within wellbore 12 on wireline 16 and to a depth in wellbore 12 where information about formation 14 or formation fluid FF (FIG. 2) within formation 14 is to be obtained. Arms 31 are then deployed to urge downhole tool 10 radially within wellbore 12 so that probe member 32 projects into formation 14 a distance for sampling formation fluid FF. Designating the distance for inserting probe member 32 into formation 14 is within the capabilities of one skilled in the art. Alternatively, probe member 32 is itself deployed and moved radially outward with respect to housing 30. Formation fluid FF is urged into probe member 32, either by a pressure differential between formation 14 and inside probe member 32; or by a pump (not shown) in fluid communication with inside of probe member 32. Prior or contemporaneous with urging formation fluid FF into probe member 32, valve 34 is put into a flow control position to allow fluid communication through probe member 32; example flow control positions include fully open, or partially opened an amount to regulate or control a designated rate of flow of fluid. A closed position of valve 34 blocks fluid communication through probe member 32. Referring back to FIG. 3, an optional actuator 56 is schematically illustrated which provides a motive force for putting valve 34 into a designated position or configuration. Actuator 34 is energized by actuating means 36; which in an example includes a hydraulic power section (not shown) or an electrical power source. One embodiment of the hydraulic power section includes an atmospheric chamber, an equalizer, and a source of pressurized hydraulic fluid; which in one example is made up of an electric motor that drives a hydraulic pump that pressurizes the hydraulic fluid. In an example, line 58 conveys pressurized hydraulic fluid to actuator 56. Embodiments exist where actuator 56 includes any device in which energy from a pressurized hydraulic fluid or an electrical power source is converted into a mechanical force. Further in this non-limiting example of operation, with valve 34 in a fluid communication configuration, an optical analyzer 60 is used to obtain information about formation fluid FF directed into probe member 32. Formation fluid FF exiting from an end of probe member 32 opposite formation 14 defines a flow of sampled fluid 52 shown being directed into housing 30 of sample tank 38. The flow of sampled fluid 52 is directed along the tortuous path P where it impinges the baffles $54_{1-8}$, and during which gas G is released from the flow of sampled fluid 52 to form a gas fraction. All or a part of the gas fraction is directed through vent line 40, and collected within sample bottle 42 (FIG. 2). Liquid L of the liquid fraction is shown collected in an end of separation tank 38 proximate drain line 44. Further in this example, liquid L is removed from separation tank 38 by flowing into drain line 44 and routed to a suction end of pump 46, which pressurizes the liquid L and urges it into discharge line 48. The liquid L directed into discharge line 48 is deposited directly into wellbore 12. The liquid L is substantially gas free, and examples exist where static head of a column of well fluid WF inside the wellbore 12 is increased or maintained at the same magnitude by addition of the liquid L after being deposited into the wellbore 12. An advantage of the present disclosure is that when formation fluid FF is being sampled and a portion of the formation fluid FF is subsequently deposited into a wellbore, a downhole incident is avoided by removing a gas fraction of the formation fluid FF before depositing the portion.

Figure 4A:
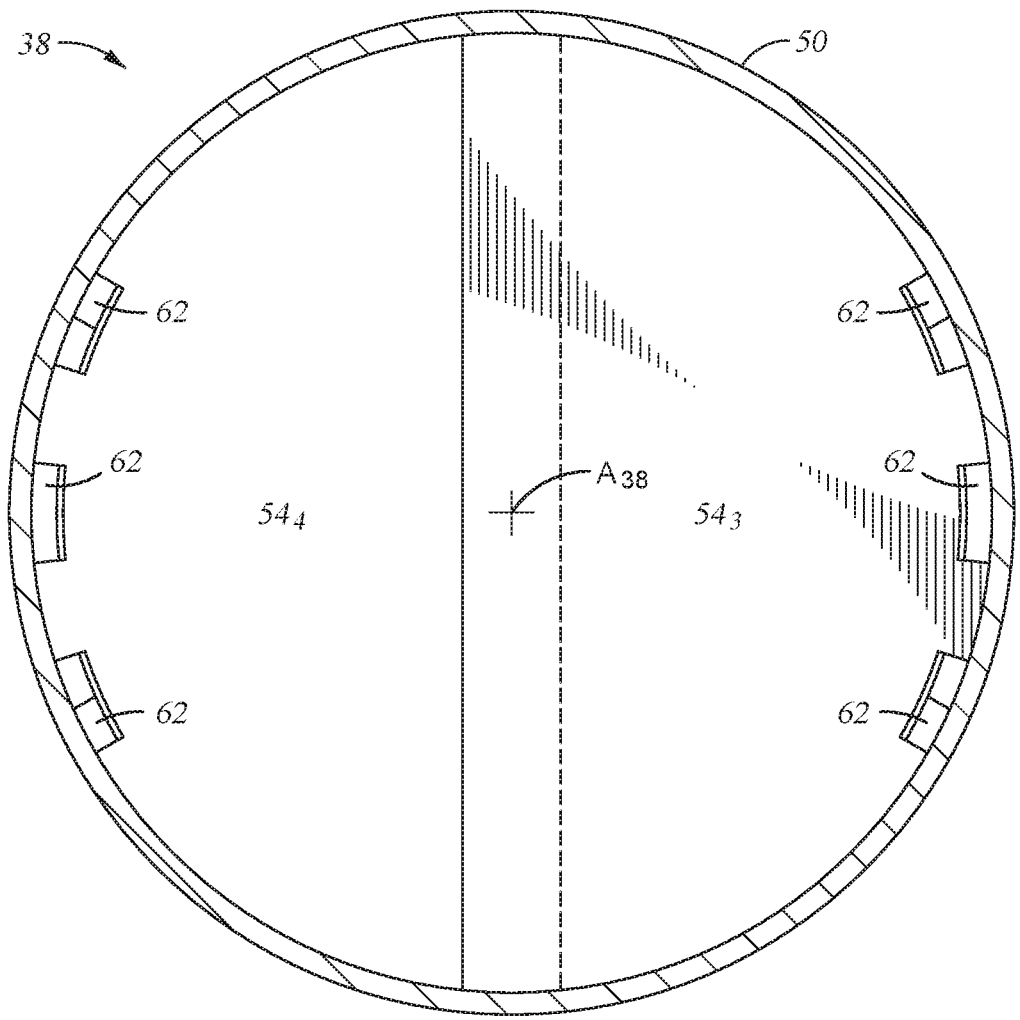
FIGS. 4A and 4B are axial sectional views of examples of the separation tank for FIG. 3 taken along lines 4A-4A and 4B-4B respectively.
Figure 4B:
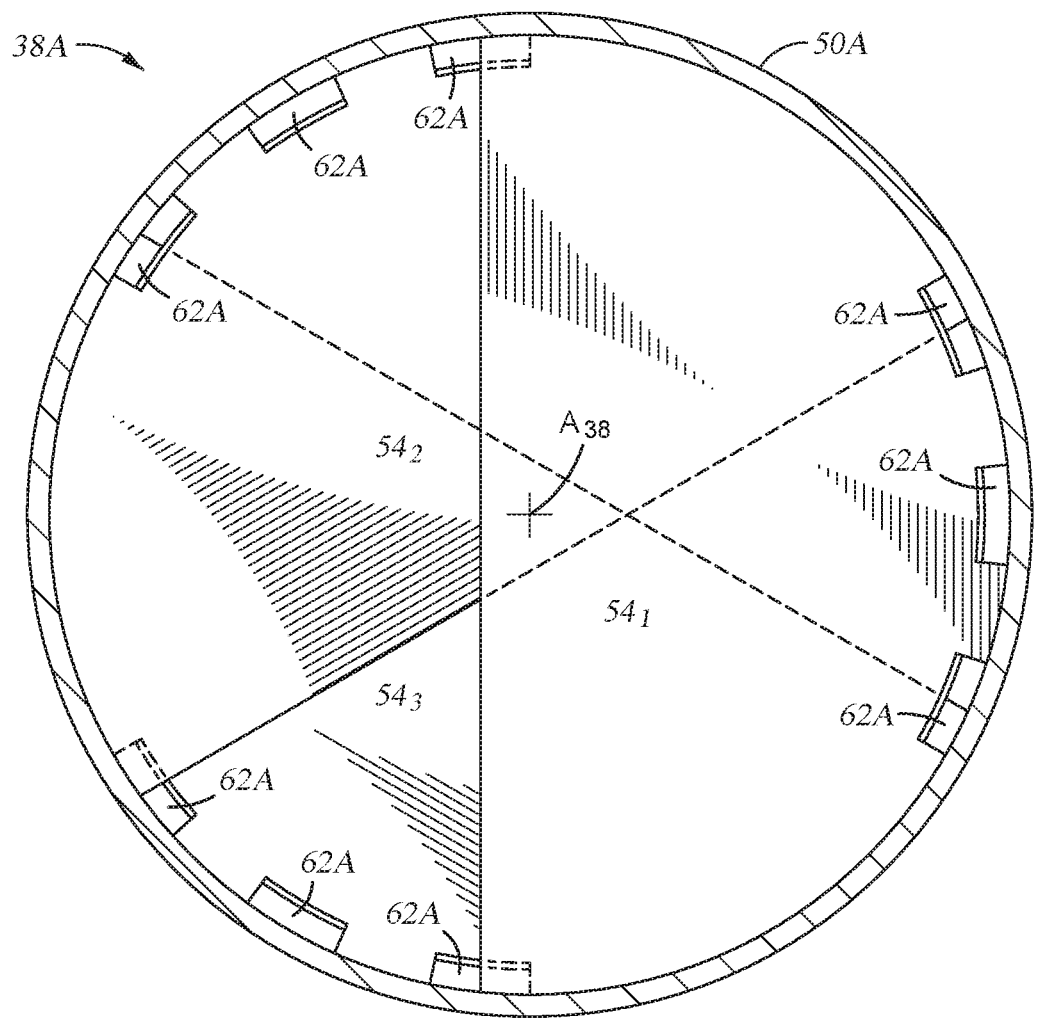

FIG. 4A is an overhead view of an example of separator 38 taken along lines 4A-4A of FIG. 3. This view axially intersects baffle $54_2$ so that a portion of baffle $54_2$ distal from axis $A_{38}$ is not shown. Similar to baffles $54_{1-8}$ of FIG. 3, baffles $54_{2, 3, 4}$ have semi-circular shapes with portions of their outer peripheries that are curved engaging an inner surface of housing 50, and the straight line portions (shown in dashed outline for baffles $54_{3, 4}$) proximate axis $A_{38}$. Shown in this view are optional openings 62 provided axially through baffles $54_{2, 3, 4}$ and adjacent the sidewalls of housing 50. Which as depicted in FIG. 3 provide a pathway for gas G on a side of any of the 54$_{1-8}$ opposite vent line 40 to pass through baffles 54$_{1-8}$ and make its way to vent line 40. Referring to FIG. 4B, shown in overhead view is an alternate example of separator tank 38A taken along lines 4B-4B of FIG. 3, and where baffles 54A$_{1, 2, 3}$ are staggered vertically and also azimuthally from one another. Similarly, alternate examples of baffles for use with the separator tank 38 of the present disclosure exist having different shapes and configurations, and which define a tortuous path P for a sampled flow of fluid for segregation into gas and liquid fractions.

That described here, is well adapted to carry out the objects and attain the ends and advantages mentioned, as well as others inherent there. While a presently preferred embodiment has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A downhole tool for use in a wellbore comprising:
a housing;
a probe member that is radially extendable from the housing and has an end that is selectively in communication with formation fluid disposed in a formation around the wellbore;
a separator tank in the housing coupled with the probe member, and which selectively receives a flow of formation fluid from the probe member;
a liquid drain line; and
baffles that are planar members and disposed in the separator tank between where the flow of formation fluid is received by the separator tank and the liquid drain line, each baffle having a portion that is intersected by a longitudinal axis of the separator tank.

2. The downhole tool of claim 1, wherein the baffles are each semi-circular, and each baffle has an outer periphery with a portion that engages an inner surface of the separator tank.

3. The downhole tool of claim 1, wherein the baffles are tilted in a direction towards the liquid drain line.

4. The downhole tool of claim 1, where the liquid drain line comprises an inlet end in fluid communication with liquid inside the separator tank, and an exit end that projects outside of the housing and is in selective communication with the wellbore and a sample bottle in communication with gas inside the separator tank through a vent line.

5. The downhole tool of claim 1, wherein the baffles are strategically arranged in the separator tank to direct the flow of formation fluid along a tortuous path that sequentially intersects each of the baffles and the flow of formation fluid impinges each of the baffles along a flow path that is perpendicular to a surface of each baffle.

6. The downhole tool of claim 1, further comprising openings in the baffles that receive gas released from the formation fluid flowing in the separator tank.

7. The downhole tool of claim 1, where the baffles are semi-circular and having an outer periphery with a curved portion that is in contact with an inner surface of the separator tank, and a linear portion spanning between terminal ends of the curved portion, where the linear portion is titled towards the liquid drain line, and where the baffles are arranged at different azimuthal locations within the separator tank.

8. A downhole tool for use in a wellbore comprising:
a housing;
a separator tank in selective communication with a flow of fluid sampled from a formation surrounding the wellbore;
planar baffles mounted at different elevations in the separator tank and strategically arranged in a projected path of the flow of fluid inside the separator tank, so that when the flow of fluid enters the separator tank, the flow of fluid sequentially impinges each of the baffles in an orientation normal to an upper surface of the baffles to release gas from within the flow of fluid; and
a gas vent line connected to the separator tank and that selectively contains an amount of gas released from impinging the flow of fluid with a one of the baffles.

9. The downhole tool of claim 8, further comprising a liquid discharge line having an end in fluid communication with liquid from the flow of fluid, and an opposing end outside of the housing and in direct communication with the wellbore, and where a flow of the liquid from the flow of fluid flows through the liquid discharge line from the separator tank and directly into the wellbore.

10. The downhole tool of claim 8, further comprising a sample bottle in communication with an end of the gas vent line distal from the separator tank, and which selectively contains an amount of the gas released from the flow of fluid.

11. The downhole tool of claim 8, further comprising a probe member that projects radially from the housing and with opposing ends in selective communication with fluid in the formation and the separator tank.

12. The downhole tool of claim 11, further comprising arms that are selectively deployed radially away from the housing on a side opposite the probe member.

13. A method of downhole operations in a wellbore comprising:
separating a flow of fluid sampled from a formation that is around the wellbore into a gas fraction and a liquid fraction by introducing the flow of fluid into a separator tank having vertically spaced apart baffles, and directing the flow of fluid along a tortuous path that intersects an axis of the separator tank to impinge the flow of fluid sequentially with each of the baffles;
containing at least a portion of the gas fraction in the wellbore, and removing the portion from the wellbore; and
directing the entire liquid fraction into the wellbore.

14. The method of claim 13, where impinging the flow of fluid into interfering contact the baffles in the separator tank causes the gas fraction to escape from the flow of fluid.

15. The method of claim 13, where the step of directing the entire liquid fraction into the wellbore comprises pumping the liquid.

16. The method of claim 13, further comprising collecting the flow of fluid from the formation by deploying a probe member from a side of a downhole tool and into intersecting contact with the formation.

17. The method of claim 13, where the gas fraction is maintained in a sample bottle that is disposed in a housing of a downhole tool.

18. The method of claim 13, further comprising analyzing the flow of fluid with an optical analyzer prior to the step of separating.

19. The method of claim 13, where discharging the liquid fraction back into the wellbore increases a static head of a liquid column in the wellbore.

* * * * *